United States Patent [19]

Lehmann et al.

[11] Patent Number: 5,737,727

[45] Date of Patent: Apr. 7, 1998

[54] PROCESS MANAGEMENT SYSTEM AND METHOD

[75] Inventors: Jean B. Lehmann, Arlington; Matthew B. Reid, Plano; Jaye D. Hicks, Frisco; Steven K. Berenbrock, Plano; Brad L. Rucker, Allen; Scott M. Boettcher, Plano, all of Tex.

[73] Assignee: Electronic Data Systems Corporation, Plano, Tex.

[21] Appl. No.: 591,920

[22] Filed: Jan. 25, 1996

[51] Int. Cl.⁶ .................................................. G06F 17/60
[52] U.S. Cl. .................................................. 705/7
[58] Field of Search .................. 705/7, 8, 9; 364/468.03, 364/468.04, 468.05, 468.02, 468.01, 474.24; 395/335, 336, 339, 12, 963, 967, 964, 965

[56] References Cited

U.S. PATENT DOCUMENTS

| | | | |
|---|---|---|---|
| 538,698 | 8/1895 | Aldrich et al. | 395/127 |
| 5,212,771 | 5/1993 | Gane et al. | 395/160 |
| 5,301,301 | 4/1994 | Kodosky et al. | 395/349 |
| 5,310,349 | 5/1994 | Daniels et al. | 395/338 |
| 5,359,523 | 10/1994 | Talbott et al. | 364/468.03 |
| 5,430,873 | 7/1995 | Abe et al. | 395/702 |
| 5,450,540 | 9/1995 | Spohrer et al. | 395/334 |
| 5,481,668 | 1/1996 | Marcus | 395/349 |
| 5,504,851 | 4/1996 | Maesano et al. | 395/340 |
| 5,552,995 | 9/1996 | Sebastian | 364/468.03 |
| 5,555,406 | 9/1996 | Nozawa | 395/11 |
| 5,557,531 | 9/1996 | Rostoker et al. | 364/489 |
| 5,572,430 | 11/1996 | Akasaka et al. | 364/468.01 |
| 5,572,436 | 11/1996 | Dangelo et al. | 364/489 |
| 5,598,344 | 1/1997 | Dangelo et al. | 364/489 |
| 5,657,460 | 8/1997 | Egan et al. | 395/326 |
| 5,664,126 | 9/1997 | Hirakawa et al. | 395/610 |

FOREIGN PATENT DOCUMENTS

WO 94/16395  7/1994  WIPO.

*Primary Examiner*—Donald E. McElheny, Jr.
*Attorney, Agent, or Firm*—L. Joy Griebenow

[57] ABSTRACT

A process management system (10) for operating on a computer (102, 104, 106) includes a graphical user interface (14) for graphically presenting a process or a portion thereof to a user, a work element for graphically representing a task to be performed in the process, a work product for graphically representing a resultant product of performing a task, an agent for graphically representing an actor responsible for performing a task, and a link for graphically connecting the work element, work product, and agent indicative of interrelationships therebetween. A knowledge repository (16) is further coupled to the computer for storing valuable information regarding the process.

79 Claims, 9 Drawing Sheets

PROCESS MANAGEMENT SYSTEM AND METHOD

TECHNICAL FIELD OF THE INVENTION

This invention is related in general to the field of computer software programs. More particularly, the invention is related to a process management system and method therefor.

BACKGROUND OF THE INVENTION

When faced with a complex task, careful consideration and planning are often required to analyze the problem and define the efforts and resources needed to successfully complete the task. Process management refers to the "direction, control, and coordination of work performed to develop a product or perform a service"[1]. It involves the specification of who, what, and how requirements for completing tasks. Some companies manage their processes by documenting them in voluminous paper documents, which are difficult and cumbersome to revise, reprint, redistribute, and consult.

There are some existing software that attempt to provide an automated and computerized tool to perform process management, including Project Bridge Modeler by Applied Business Technology, Process Engineer by Learmonth & Burchett Management Systems, Methodology Administration Platform by Structured Solutions, Hyper Analyst by Bachman, and firstCASE by AGS Management Systems. These existing process management software tools share some common weaknesses, including a non-graphical expression of the modeled process, a restriction on the number of hierarchical levels allowable in the process, a lack of support for iterative processes, and a lack of support for storing process information in a repository for multi-user access.

[1] Institute of Electrical and Electronics Engineers. Copyright 1991 IEEE.

SUMMARY OF THE INVENTION

Accordingly, there is a need for a process management system and method therefor that support textual and graphical expression of multiple levels of process detail, iterative processes and decision processing, and a repository of knowledge.

In accordance with the present invention, a process management system and method are provided which eliminates or substantially reduces the disadvantages associated with prior systems.

In one aspect of the invention, a process management system for operating on a computer includes a graphical user interface for graphically presenting a process or a portion thereof to a user, a work element for graphically representing a task to be performed in the process, a work product for graphically representing a resultant product of performing a task, an agent for graphically representing an actor responsible for performing a task, and a link for graphically connecting the work element, work product, and agent indicative of inter-relationships therebetween. A knowledge repository is further coupled to the computer for storing valuable information regarding the process.

In another aspect of the invention, a method for defining and managing a process on a computer includes the steps of graphically representing a task with a work element graphical object, defining properties associated with the work element graphical object, graphically representing a product resulting from performing a task with a work product graphical object, defining properties associated with the work product graphical object, graphically representing an actor with an agent graphical object, defining properties associated with the agent graphical object, and graphically linking the work element, work product, and agent graphical objects to indicate a process flow.

In yet another aspect of the invention, a method for defining and managing a process on a computer includes the steps of graphically displaying a defined process where tasks are graphically represented by a work element graphical object, products resulting from performing a task are graphically represented by a work product graphical object, actors are graphically represented with an agent graphical object, and said graphical objects are linked to indicate a process flow. A work element graphical object may be expanded to drill down to a graphical representation of a sub-process. Properties associated with the work element, work product, and agent graphical objects may also be displayed.

BRIEF DESCRIPTION OF THE DRAWINGS

For a better understanding of the present invention, reference may be made to the accompanying drawings, in which.

DETAILED DESCRIPTION OF THE INVENTION

Figure 1:
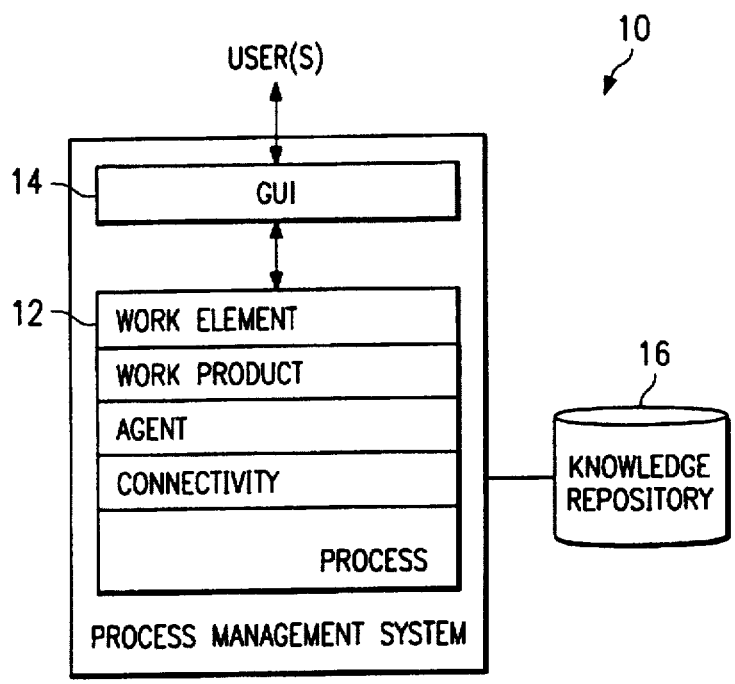
FIG. 1 is a simplified block diagram of a process management system and method constructed according to the teachings of the present invention.

The preferred embodiment(s) of the present invention is (are) illustrated in FIGS. 1–15, like reference numerals being used to refer to like and corresponding parts of the various drawings.

Referring to FIG. 1, a process management system constructed according to the teachings of the present invention is shown indicated generally at 10. Process management system 10 uses a number of major components 12, including work element, work product, agent, and several connectivities, to represent or express a process. The process is presented to user(s) graphically through a graphical user interface (GUI) 14. A knowledge repository 16 is coupled to process management system 10 for storing knowledge acquired in formulating past processes, such as templates of existing processes. In one embodiment of the present invention, process management system 10 is developed using object-oriented software development technology. Process management system 10 may be written in the C++ programming language, and commercially available GUI class libraries Tools.h++ from Rogue Wave and/or StarView from Star Division may be used.

Figure 2A:
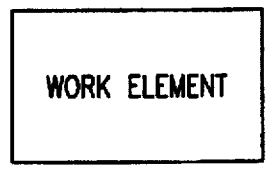
FIG. 2A to 2I are exemplary process notations of components and connecting links.
Figure 2B:
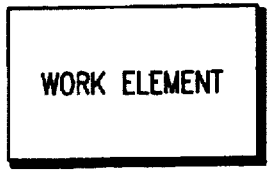
Figure 2C:
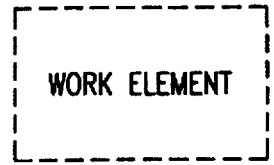
Figure 2D:
Figure 2E:

FIGS. 2A through 2I show the exemplary notations used to represent the various components of a process. FIG. 2A shows a work element represented by a rectangle, which is a task that is to be performed. FIG. 2B is a rectangle with a shadow, which represents a summary work element that has more process details and may be expanded to view those details. The process of expanding a component to view additional details is also called "drill down". In FIG. 2C, a rectangle with dash lines is a conditional work element, representing a task that is to be performed if a condition is met. FIG. 2D is a work product, represented by a circle as shown or an ellipse. A work product is the result of performing a task or work element. FIG. 2E is an agent, represented by a hexagon, which is the person, machinery, automation, or software that is responsible for the task.

Figure 2F:
Figure 2I:
Figure 2G:
Figure 2H:

The major components: work element, work product, and agent of the process are connected by links shown in FIGS. 2F through 2I. A line in FIG. 2F is a responsibility connection, a line with an arrow thereon in FIG. 2G denotes input or output, and a dashed line with an arrow in FIG. 2H is a conditional input/output. FIG. 2I shows a connection used to represent iteration.

Figure 3:
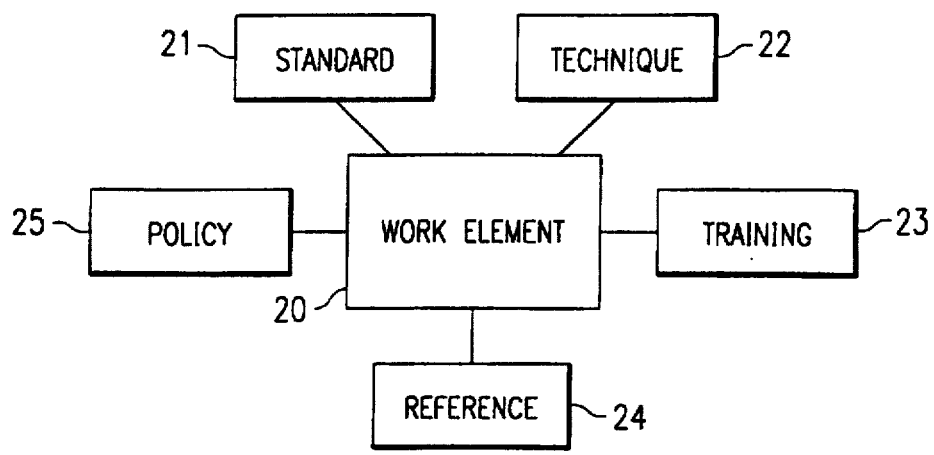
FIG. 3 is a diagram showing a major component, work element, and its minor components.

Each of the major components, work element, work product, and agent, can be linked to many minor components or properties or traits, which further describe the methodology or process. FIG. 3 shows the exemplary minor components of a work element 20: standard 21, technique 22, training 23, reference 24, and policy 25. Standard 21 may specify the standard by which the work element is measured, such as the Capability Maturity Model (CMM) established by Software Engineering institute (SEI). Technique 22 may specify the techniques that can be used to perform the task described in the work element, such as brainstorming, modeling, prototyping, simulation, technical review, etc. Training 23 may set forth the training available to help perform the task in work element 20. Reference 24 may include a bibliography of articles, books, and technical magazines that are associated with the performance of work element 20. Policy 25 may specify the governmental or company policies related to the performance of work element 20.

Figure 4:
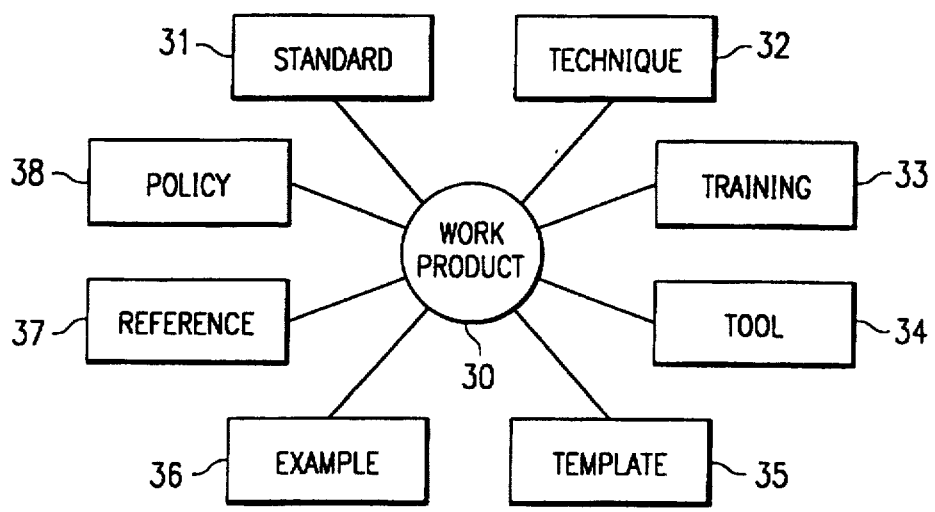
FIG. 4 is a diagram showing a major component, work product, and its minor components.
Figure 5:
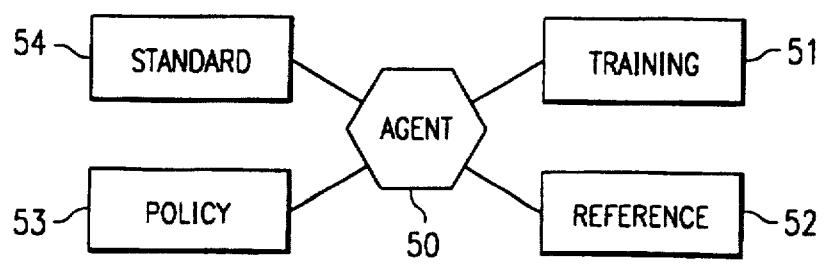
FIG. 5 is a diagram showing a major component, agent, and its minor components.

FIG. 4 shows the exemplary minor components related to a work product 30. Standard 31 may describe the standard used to measure the quality of work product 31. Technique 32 may describe the techniques that can be used to produce work product 30, such as joint iterative rapid development, financial cost models, function-level risk assessment, or precedence diagraming. Training 33 may describe the training class, seminar, or materials available or required to train for producing work product 30. Tool 34 sets forth the tool(s) needed to produce or make work product 30. Template 35 provides a shell or pattern that can be used as a guide for the development of work product 30 to speed up the process. Representative examples of work product 30 or completed templates may be provided as examples 36 of work product 30. If a tool or template is associated with an application, such as WordPerfect, Word, and Lotus 1-2-3, for example, system 10 automatically launches the application. Reference 37 is a bibliography that may provide additional information regarding making work product 30. Policy 38 sets forth any policy or policies encompassing the act of producing work product 30.

Four exemplary minor components are shown related to agent 50. Training 51 sets forth the training available for the agent. For example, if an agent is a project manager, the associated training may include project management development, leadership development, and customer relations. For a software developer, the training may include programming logic, object oriented programming principles, and C++ programming language. Reference 52 may list articles, books, and other information related to agent 50. Policy 53 may list any policy that is related to agent 50. Finally, standard 54 may describe the standards by which agent 50 is compared and measured.

It is important to emphasize that although specific symbols and components have been set forth above, they serve as examples and do not limit the teachings of the present invention to those embodiments explicitly shown.

Figure 6:
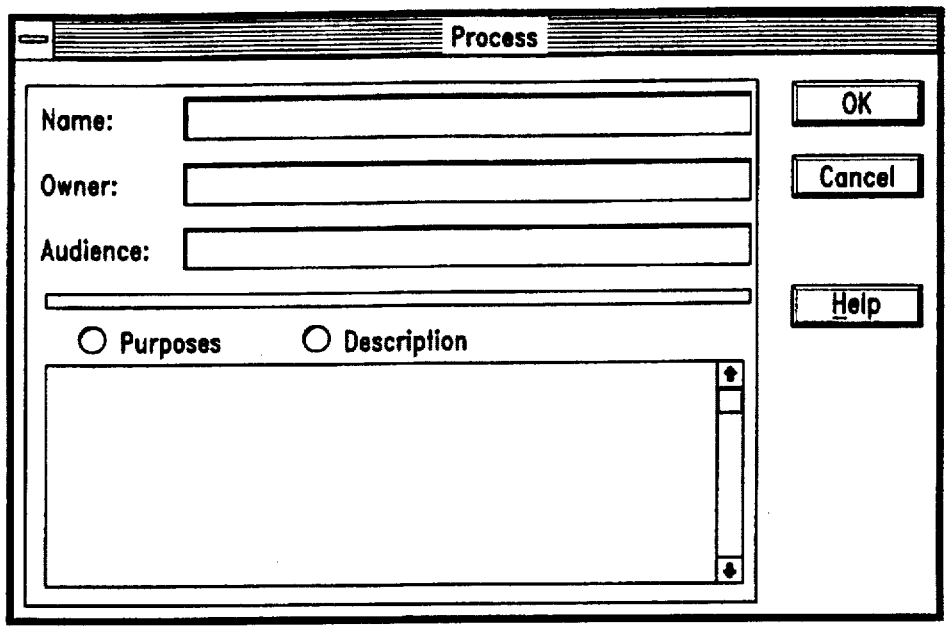
FIG. 6 is an exemplary dialog window prompting for process information.

FIGS. 6–10 are simplified exemplary dialog windows used to formulate a methodology or process. Referring to FIG. 6, an exemplary dialog window prompting for information on the process is shown. The name of the process, its owner, audience, purpose, and further descriptions may be specified. The owner of a process is the entity that owns the definition of the item. Accordingly, a process may be built from pieces of other processes. For example, a systems engineering process may reference start-up activities owned by a project management process. A special link may be used to tie processes together without making a new copy of the existing process. Information used to summarize a process is shown in the following table, some of which may not be shown in FIG. 6, in which A/N stands for alphanumeric:

| PROCESS | | | |
|---|---|---|---|
| ATTRIBUTE | DESCRIPTION | REQ | TYPE |
| Name | Long title of the process | Y | A/N |
| Short Name | Short title of the process | Y | A/N |
| Level | Level in the Methodology Architecture (e.g. Framework, Method, or Process) | Y | A/N |
| Status | Indication of the degree of completeness of the process | Y | A/N |
| Organization | Name of the organization that owns the definition of the process | Y | A/N |
| Purpose | List of objectives/reasons for using this process | Y | A/N |
| Description | Overview/definition of the process | | A/N |
| Audience | Description of the targeted audience for this process | | A/N |
| Context | Brief description of how this process fits interrelates with other related material | | A/N |
| Contact | Where to go for additional information | | A/N |
| Benefits | List of benefits of this process to company and to the customer | | A/N |
| Scope | Brief description of the scope of the process | | A/N |
| Version/Release | Indication of the applicable version and release | | A/N |

Note that a Help button, if clicked on, provides context-sensitive on-line help support to the user.

Figure 7:
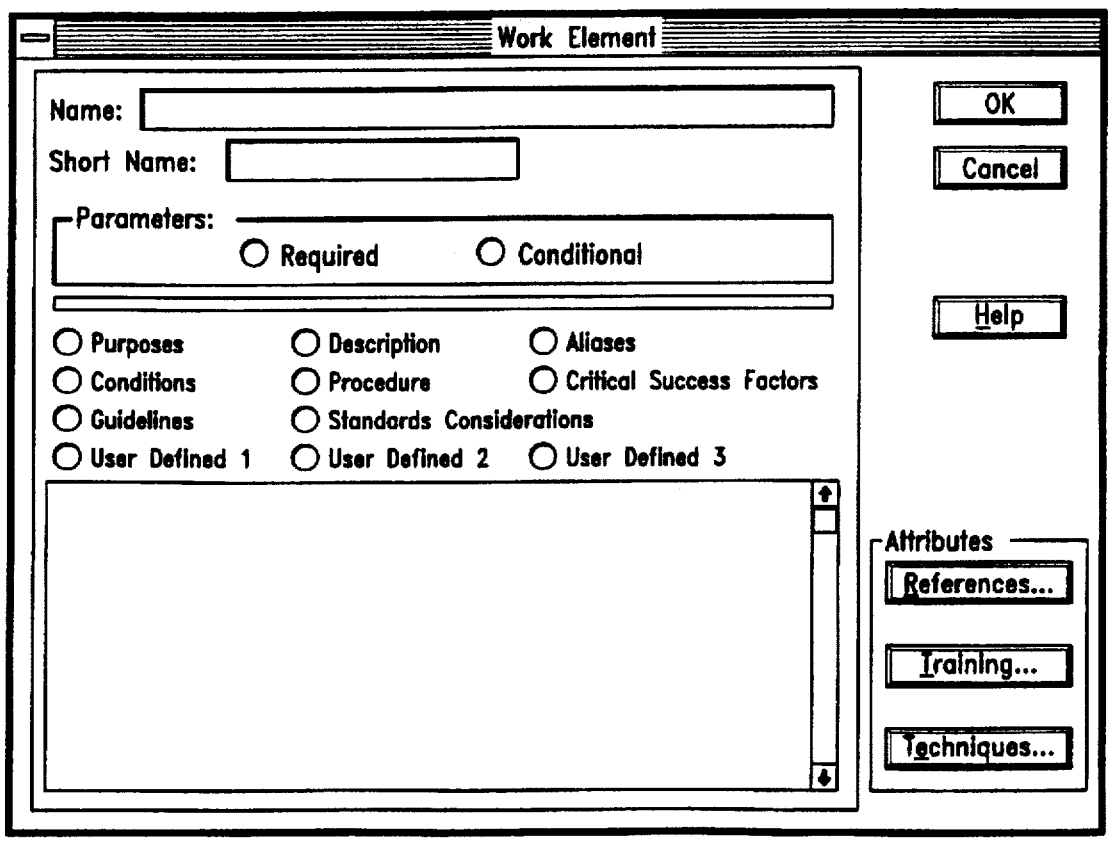
FIG. 7 is an exemplary dialog window prompting for work element information.

FIG. 7 shows an exemplary dialog window for entering information on a work element, including name, short name, whether the work element is required or conditional, and additional textual information such as: purposes, conditions, guidelines, procedure, description, etc. Dialog windows for entering attributes or associated minor components, such as references, training, and techniques are further reachable by clicking on respective push buttons. The following table summarizes the exemplary information used to describe a work element. The IF SUMMARY column indicates whether the attribute is specified, can be rolled up from lower detailed level attributes, or can be derived.

Figure 8:
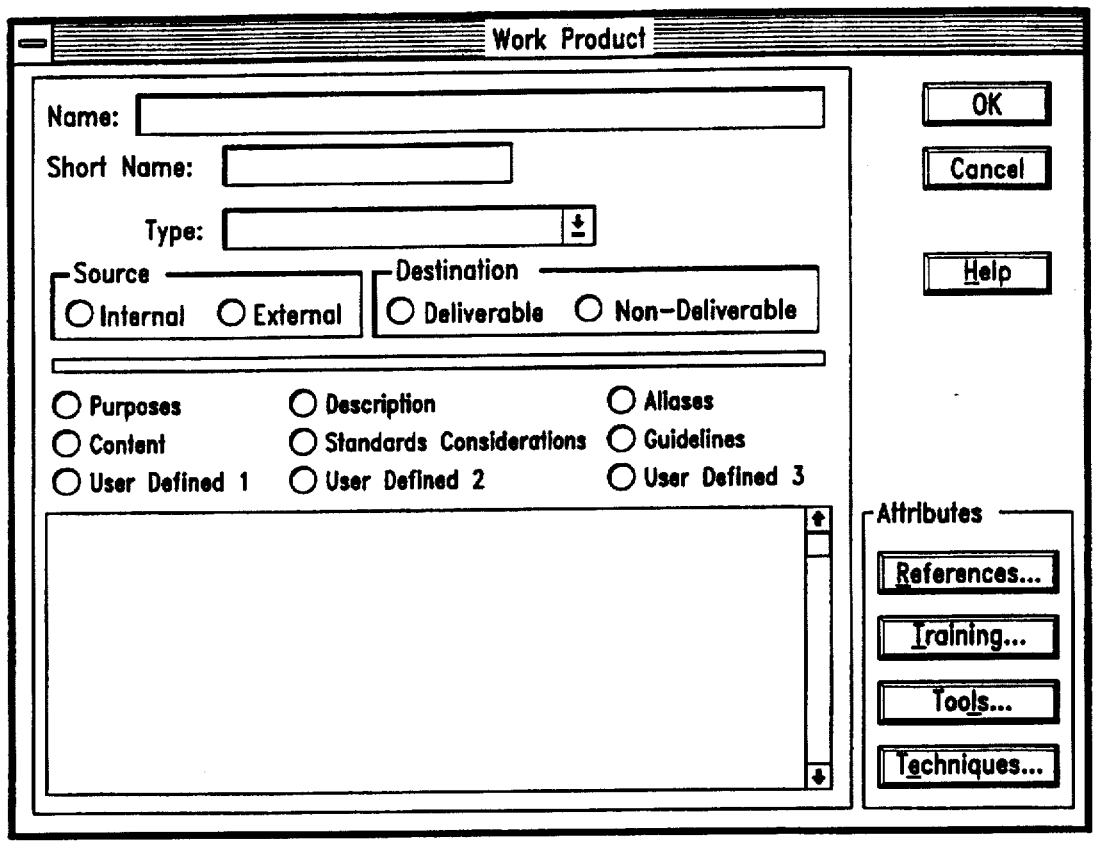
FIG. 8 is an exemplary dialog window prompting for work product information.
Figure 9:
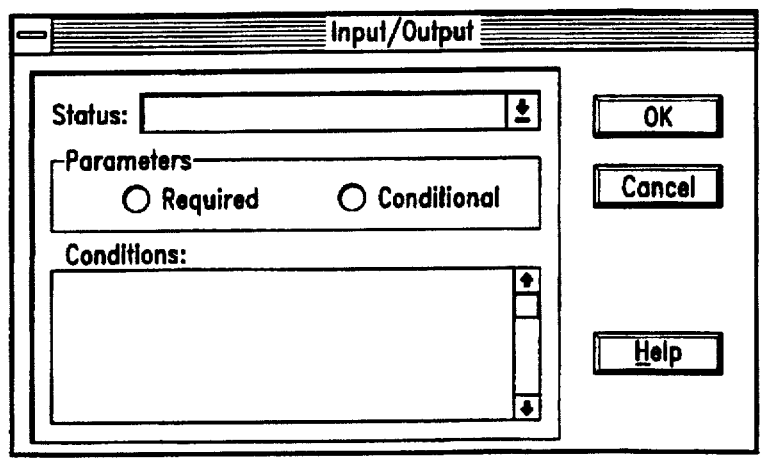
FIG. 9 is an exemplary dialog prompting for process input/output information.
Figure 10:
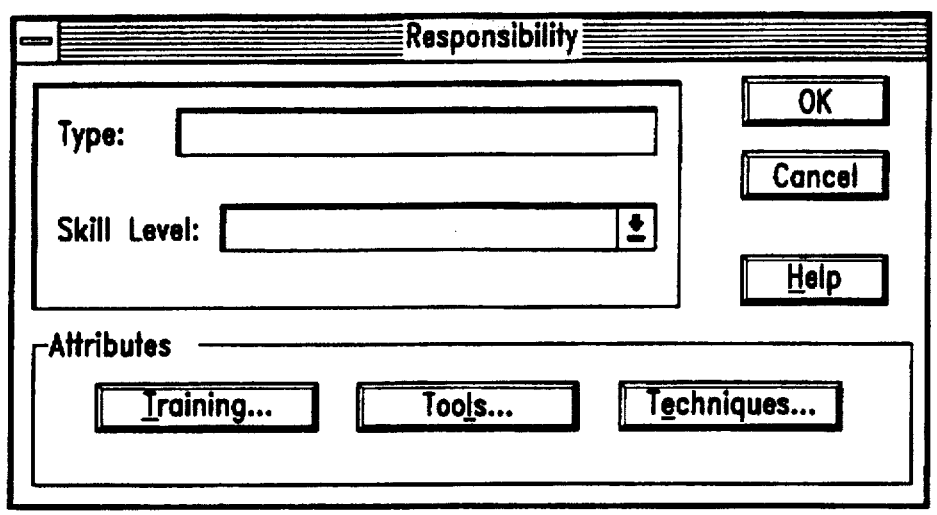
FIG. 10 is an exemplary dialog window prompting for responsibility information.

FIG. 8 is an exemplary window for requesting information on a work product. The table below summarizes the information used to describe a work product.

WORK ELEMENT

| ATTRIBUTE | DESCRIPTION | REQ | TYPE | IF SUMMARY |
|---|---|---|---|---|
| Name | Long title of the work element | Y | A/N | Specify |
| Short Name | Short title of the work element | | A/N | Specify |
| Level (NY) | Whether the work element is summary or detail (leaf) | | Derived | Derive |
| Summary Type (?) | Whether the work element summarizes its children by function or flow (for summary elements only) | | A/N | Specify |
| Alias | List of customer/local aliases for the work element | | A/N | Specify |
| Purpose | List of objectives/reasons for the work element | Y | A/N | Specify/Roll Up |
| Description | Short overview/definition of the work element | | A/N | Specify |
| Guideline | List of guidelines for performing the work element | | A/N | Specify |
| Critical Success Factor | List of items that must be present for successful completion of the work element | | A/N | Specify/Roll Up |
| Procedure | List of steps required for completing the work element; describes the "how-to" or "step-by-step" instructions (SEI) (for detail elements only) | | A/N | N/A |
| Standards Consideration | List of specific standards considerations (e.g. SEI considerations to ensure CMM Level 2) | | A/N | Specify |
| Required/ Conditional | Whether the work element is required or conditional | | Binary | Roll Up |
| Condition | List of conditions under which the work element should be completed (for conditional elements only) | | A/N | N/A |
| Entry Criteria (?) | Conditions that must be met before the work element can be started (inputs in the proper status, agents trained, task dependencies satisfied, etc.) | | Derived | Derive |
| Exit Criteria (?) | Conditions expected upon completion of the work element (outputs completed in the proper status; procedure completed, agents' responsibilities fulfilled, task dependencies satisfied, etc.) | | Derived | Derive |
| User-defined attributes (NY) | Attributes that can be assigned by the process author that are process specific (one to three available) | | A/N | Specify |

WORK PRODUCT

| ATTRIBUTE | DESCRIPTION | REQ | TYPE | IF SUMMARY |
|---|---|---|---|---|
| Name | Long title of the work product | Y | A/N | Specify |
| Short Name | Short title of the work product | | A/N | Specify |
| Level (NY) | Whether the work element is summary or detail (leaf) | | Derived | Derive |
| Type | The category of work product (e.g. decision, condition, document, individual, etc.) | | A/N | Specify/Roll Up |
| Deliverable/Non-deliverable | Whether work product can be delivered to the customer | | Binary | Specify/Roll Up |
| Internal/External | Indication of whether this work product is internally produced or externally supplied | | Binary | Specify/Roll Up |
| Alias | List of customer/local aliases for the work product | | A/N | Specify |
| Purpose | List of objectives/reasons for the work product and the data represented by the work product | Y | A/N | Specify/Roll Up |
| Description | Short overview/definition of the work product | | A/N | Specify |
| Guideline | List of format and content guidelines for the work product | | A/N | Specify |
| Content | List of the data contained in the work product with a brief description of each | | A/N | N/A |
| Standards Consideration | List of specific standards considerations (e.g. SEI considerations to ensure CMM Level 2) | | A/N | Specify |

-continued

WORK PRODUCT

| ATTRIBUTE | DESCRIPTION | REQ | TYPE | IF SUMMARY |
|---|---|---|---|---|
| User-defined attributes (NY) | Attributes that can be assigned by the process author that are process specific (one to three available) | | A/N | Specify |

The information used to describe an agent is summarized in the table below.

AGENT

| ATTRIBUTE | DESCRIPTION | REQ | TYPE | IF SUMMARY |
|---|---|---|---|---|
| Name | Long title of the agent; participant's role (e.g. project manager, data base administrator, etc.) | Y | A/N | Specify |
| Short Name | Short title of the agent; acceptable abbreviation | | A/N | Specify |
| Level (NY) | Whether the agent is summary or detail (leaf) | | Derived | Derive |
| Alias | List of customer/local aliases for the agent | | A/N | Specify |
| Description | Short overview/definition of the agent | | A/N | Specify |
| Competency | List of knowledge, skills and behaviors expected or beneficial for performing in this role | | A/N | Specify |
| User-defined attributes (NY) | Attributes that can be assigned by the process author that are process specific (one to three available) | | A/N | Specify |

Input/output is a link that connects work products and work elements. A work product is an input to a work element, and a work product can also be an output of a work element. The input/output information is shown in the tables below.

| ATTRIBUTE | DESCRIPTION | REQ | TYPE |
|---|---|---|---|
| INPUT | | | |
| Status | Degree of completeness | Y | A/N |
| Required/ Conditional | Whether the work product is required as an input under all conditions | Y | Binary |
| Condition | List of conditions under which the input should be expected (for conditional work products only) | | A/N |
| OUTPUT | | | |
| Status | Degree of completeness | Y | A/N |
| Required/ Conditional | Whether the work product is required as an output under all conditions | Y | Binary |
| Condition | List of conditions under which the output should be completed (for conditional work products only) | | A/N |

The link between an agent and a work element is the responsibility connectivity. The information used to describe responsibility is listed in the table below and shown in an exemplary dialog screen in FIG. 10:

| ATTRIBUTE | DESCRIPTION | REQ | TYPE |
|---|---|---|---|
| RESPONSIBILITY | | | |
| Type | The responsibility/authority the agent has for the work element | | A/N |
| Skill Level | The degree of skill in this responsibility the agent will require (e.g. novice, intermediate, expert) | | A/N |

Minor components associated with responsibility, including training, tools, and techniques, may also be specified. When these minor components are selected, appropriate dialog windows pop up to receive information entered by the user/author in a similar manner, using some of the same graphical tools shown. The information associated with each minor component is shown in the tables below.

| ATTRIBUTE | DESCRIPTION | REQ | TYPE |
|---|---|---|---|
| TOOL | | | |
| Name | Title of the tool | Y | A/N |
| Type | Generalized type of tool (e.g. spreadsheet, word processor, etc.) | | A/N |
| Description | Short overview/definition of the tool | Y | A/N |
| Execution Information | Execution requirements for launching the tool | Y | |
| TECHNIQUE | | | |
| Name | Title of the technique | Y | A/N |
| Type | Generalized type of technique (e.g. modeling, prioritization, etc.) | | A/N |
| Description | Short overview/definition/ abstract of the technique | Y | A/N |
| Execution | Executable file/directory instructions for | Y | |

-continued

| ATTRIBUTE | DESCRIPTION | REQ | TYPE |
|---|---|---|---|
| Information TEMPLATE | launching the associated tool | | |
| Name | Title of the template | Y | A/N |
| Explanation | Brief description to make the template clear and understandable | | A/N |
| Execution Information | Executable file/directory and execution instructions for launching the associated tool | Y | |
| EXAMPLE | | | |
| Name | Name of the example | Y | A/N |
| Explanation | Brief description to make the example clear and understandable | | A/N |
| Execution Information | Executable file/directory and execution instructions for launching the associated tool | Y | |
| REFERENCE | | | |
| Name | Short identifier of the reference item | | A/N |
| Description | Due to the various pieces and formats of bibliographic entries the following represents suggestions for the content of an entry | | A/N |
| Publication | Name of the book, | | A/N |
| Volume or version | Volume or date of periodical, or version of the book/document | | A/N |
| Source | Body, organization, or publisher which provided or published the material | | A/N |
| Article | Title of the article or section referenced | | A/N |
| Author | Author(s) of the book, article or other publication | | A/N |
| Content | Brief description or key words for the content of the material | | A/N |
| Execution Information | Executable file/directory and execution instructions for launching the associated tool | | |
| TRAINING | | | |
| Name | Title or name of the training course of material | Y | A/N |
| Purpose | List of learning objectives for the training course or material | | A/N |
| Description | Summary/synopsis of the content of the course or material | | A/N |
| Provider | Company or organization that provides the training course or material | Y | A/N |
| Contact | Directions for ordering, enrollment, or requesting more information about the course of material | | A/N |
| Execution Information | Executable file/directory and execution instructions for launching the associated tool | | |
| POLICY | | | |
| Name | Short description of the policy; policy provides the law or regulations that govern, guide, or constrain operations (SEI) | Y | A/N |
| Type | Functional grouping | | A/N |
| Statement | Policy statement | Y | A/N |
| Execution Information | Executable file/directory and execution instrutions for launching the associated tool | Y | |
| STANDARD | | | |
| Name | Short description of the standard; standard provides the operational definitions or acceptance criteria for final or interim products or process (SEI) | Y | A/N |
| Type | Functional grouping | | A/N |
| Statement | Standard statement | Y | A/N |

-continued

| ATTRIBUTE | DESCRIPTION | REQ | TYPE |
|---|---|---|---|
| Execution Information | Executable file/directory and execution instructions for launching the associated tool | Y | |

It must be noted that the exemplary screens shown in FIGS. 6–10 are illustrative only, and that windows tools and manipulations such as push buttons, pull-down menus, tool bars, status lines, scroll bars, etc. as known in the art may be incorporated and/or substituted therein.

Figure 11:
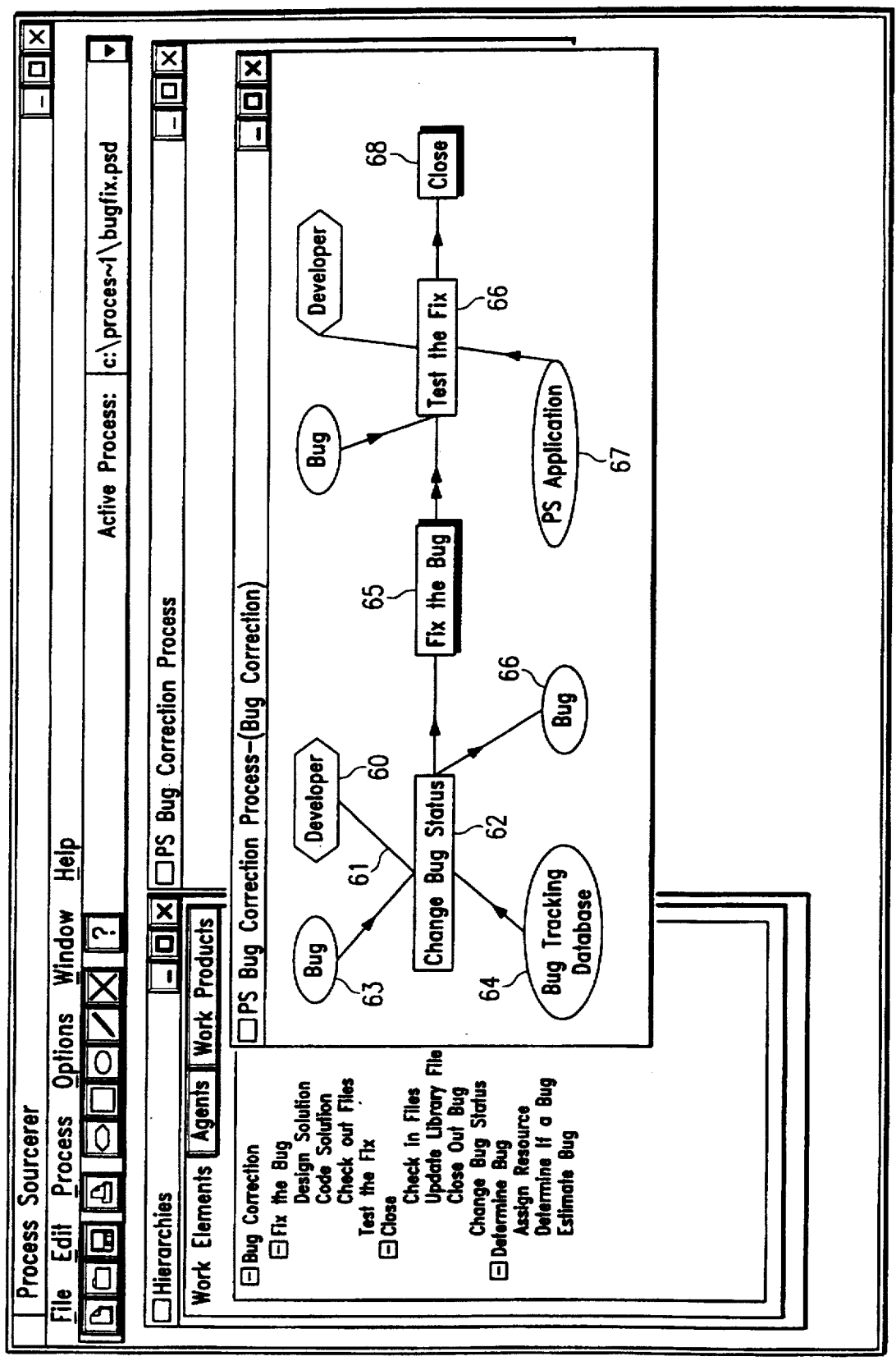
FIG. 11 is an exemplary graphical screen showing a bug correction process.

FIG. 11 is an exemplary screen showing a bug correction process. A hierarchies window is to the left of the process window, which displays a graphical representation of the process. The hierarchies window currently shows the work element hierarchy, but may be changed to show agent or work product hierarchies of the process by clicking on the appropriate buttons immediately above the window. Those entries with a square icon appearing to the left of the text indicates that these elements are expandable and the user may drill down to a lower level. These expandable elements, for example "fix the bug" and "close", are shown in the graphical window with a shadow.

The process window contains the graphical depiction of a process or a portion of a process. Process windows contain agents, work elements, work products, and any connections therebetween. Every image in a process window is a selectable object that has properties associated therewith. Summary work elements shown as a work element with a shadow represent the existence of additional details in the form of another process window that can be reached by drilling down or double clicking on the work element. In this manner, complex processes may be organized into multiple levels of abstraction to facilitate the presentation and understanding thereof.

A customized tool bar is further provided to permit the user to select operations such as open file, close file, save file, print, and to further select icons for the work element, work product, agent, and links therebetween to build or modify the displayed process. The graphical display may be easily manipulated, for example, the size and location of the windows can be adjusted by clicking and dragging on the window or window boundaries, or the windows may be made to be cascaded, overlapped, or tiled.

Figure 12:
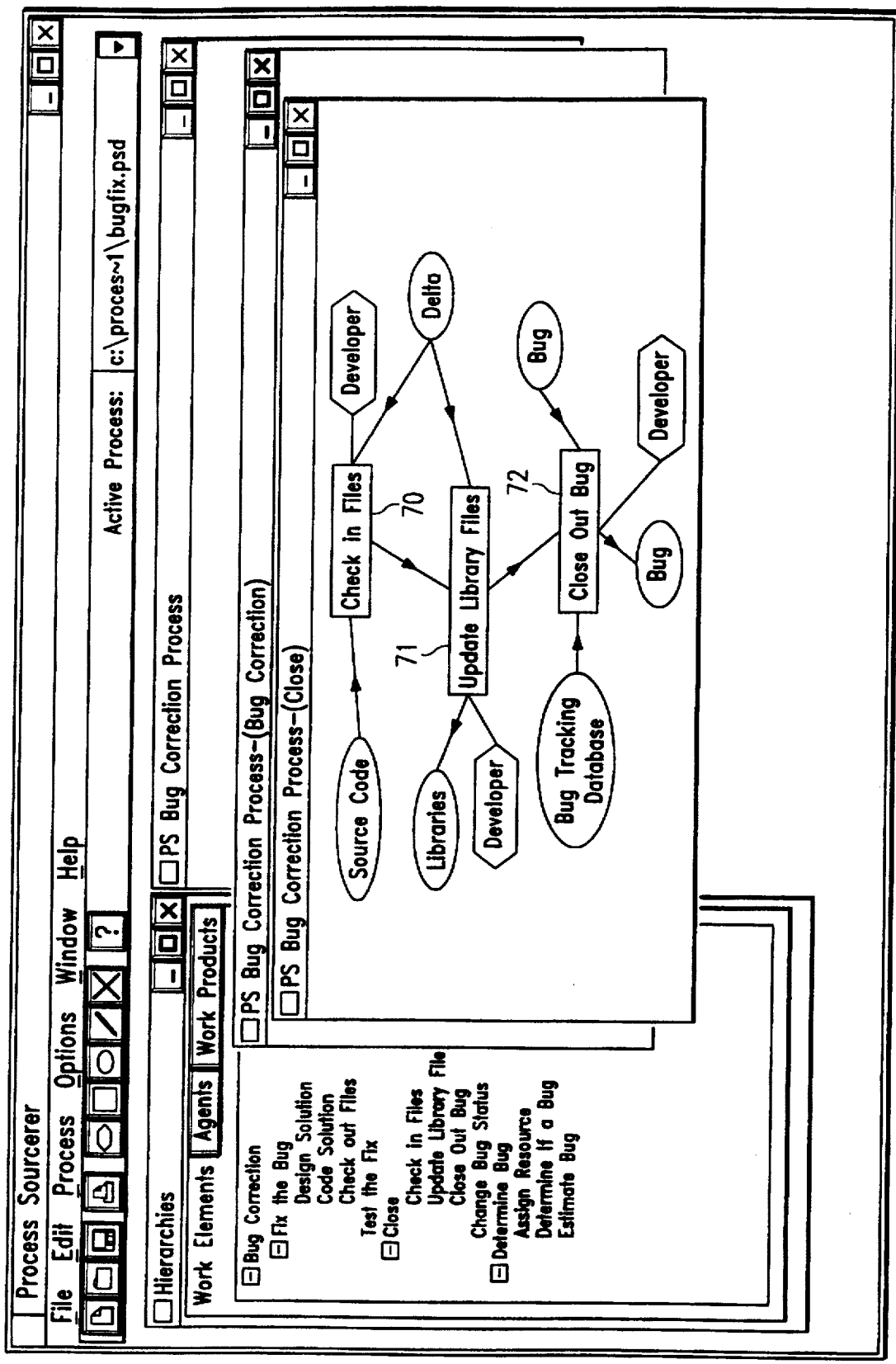
FIG. 12 is an exemplary graphical screen showing a bug correction subprocess.

It may be instructional to walk through the bug correction process to show how a process is represented. A developer 60 is responsible for (link 61) changing the bug status 62 in a piece of software. The work product of changing the bug status is a bug report 63 and a bug tracking database 64. The next task, fix the bug 65, is also recorded and documented in a bug report 66. The link between fix the bug 65 and test the fix 66 is iterative, because the first few attempts at fixing the bug may not succeed. The software (PS Application) 67 is the work product of testing the fix, if successful. If the bug fix is successful, the task close 68 is performed. Because work element close 68 is shown with a shadow, more process details exist and the work element may be expanded to drill down to the next level of details, as shown in FIG. 12. The close sub-process shown in FIG. 12 displays three tasks: check in files 71, update library files 72, and close out bug 73. The associated agents and work products of these work elements are shown. It may be seen that all work elements within a process are unique regardless of whether the name and short names are the same. Unlike work elements, agents and work products in a process that have the same name and short names are the same entity.

Therefore, all bug reports and all agents in the bug correction process are the same respective entities.

Figure 13:
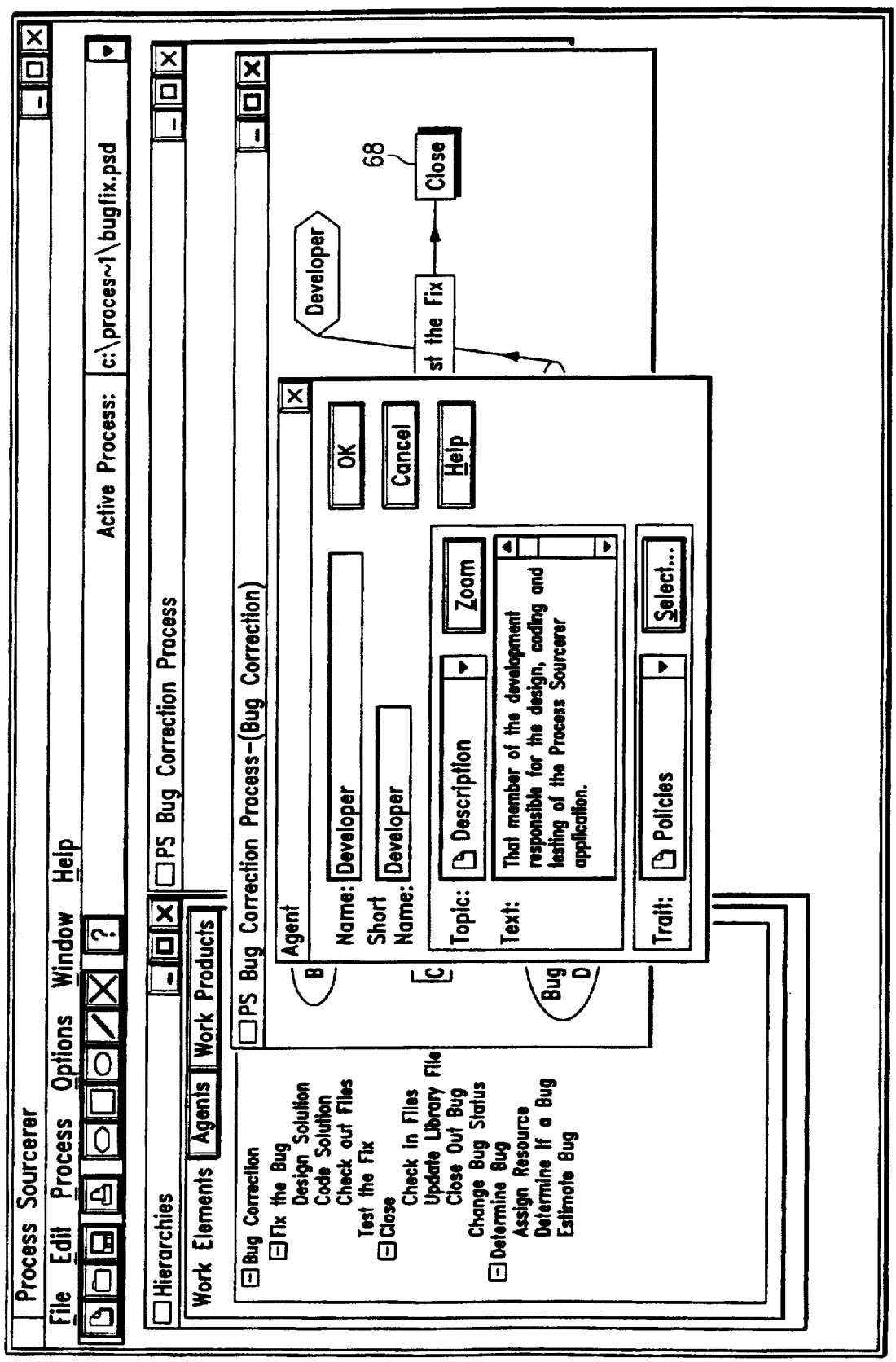
FIG. 13 is an exemplary graphical screen showing an agent dialog window.
Figure 14:
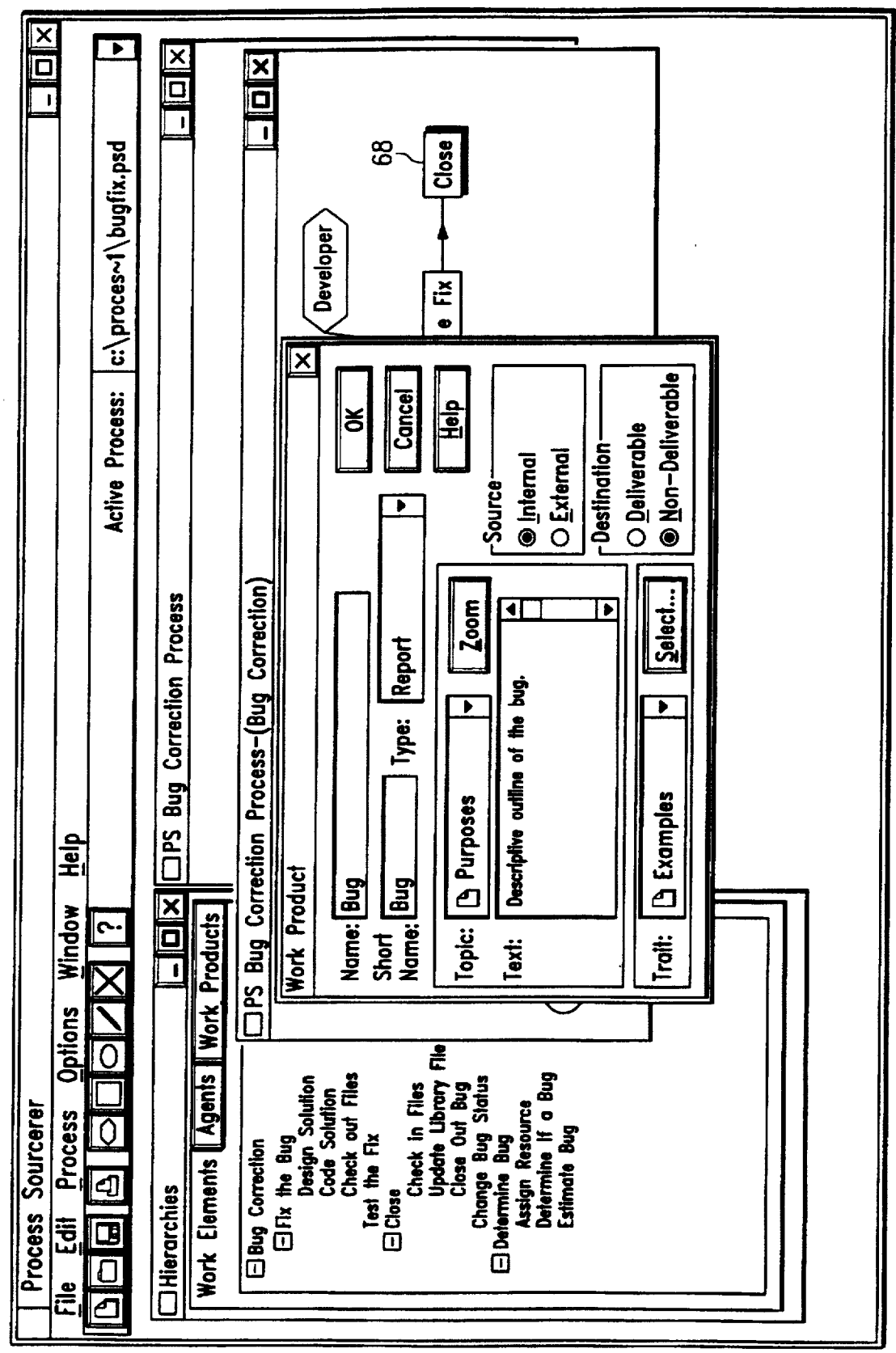
FIG. 14 is an exemplary graphical screen showing a work product dialog window.

Referring to FIGS. 13 and 14, dialog windows displaying details of the developer agent and the bug report work product are shown overlaid on top of the process graphical representation. Any agent, work product, and work element defined in the process may be clicked on and details thereof may be displayed in like manner.

Figure 15:
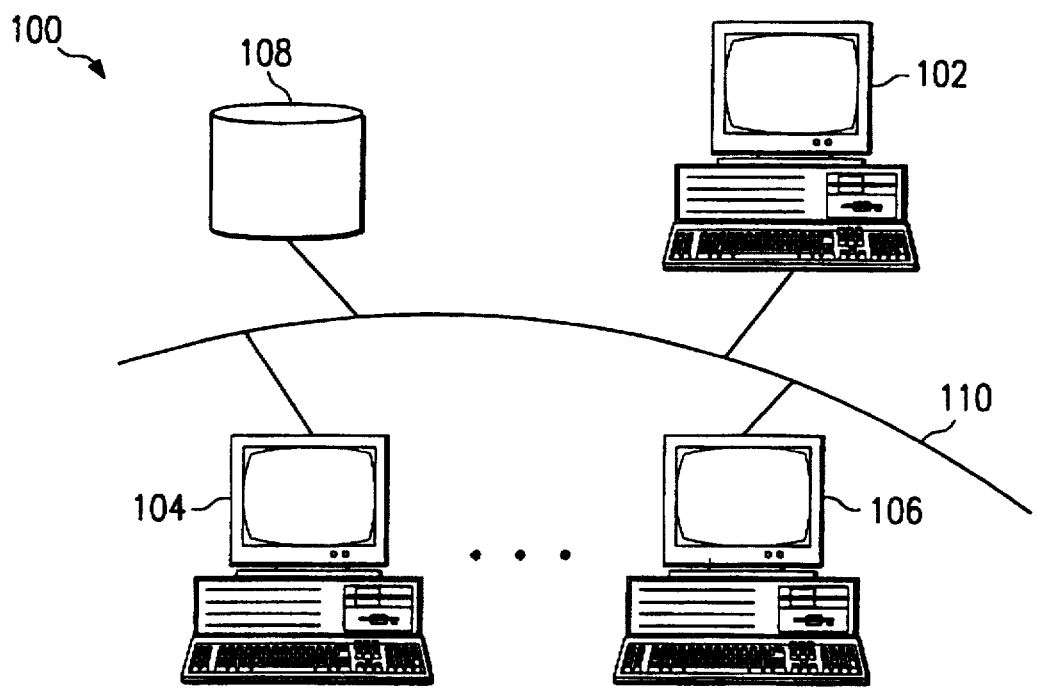
FIG. 15 is a simplified diagram showing a computer network connecting computers for accessing the process management system of the present invention and data files stored in a common shared memory.

FIG. 15 illustrates the distributed manner in which the instant system 10 may operate. Process management system 10 may be run on a stand alone personal computer or work station, or on one or more computers 102–106 that are linked together by a computer network 110. Information that can be shared by many users may be stored on a common database 108, which may also be linked by computer network 110. Operating in this manner, members of an engineering team may independently access and consult a process the team is working on.

System 10 further provides an export capability which produces files in several formats compatible with different applications. For example, Common-Separated Values formatted files may be exported to spreadsheet and database applications to generate statistical information on a process. Microsoft Project Exchange formatted files can also be produced and exported to most project management tools for project management.

Constructed in this manner, a process may be defined on process management system 10 easily and efficiently. Existing processes may also be easily revised and modified. System 10 displays the defined process in a graphical manner, which aids in the comprehension and management of the process. Knowledge accumulated from past experiences are also accessible by multiple users for reuse. For example, a company may distribute general processes that can then be customized to fit the special needs of individual organizations within the company. In this manner, existing processes may be reused and tailored to each new process without reinvestment of efforts. Through the use of system 10, company processes may be easily standardized with common terms and definitions. Furthermore, the number of levels of process details is unlimited in system 10, enabling complex processes to be represented in an uncluttered manner.

Although the present invention and its advantages have been described in detail, it should be understood that various changes, substitutions and alterations can be made therein without departing from the spirit and scope of the invention as defined by the appended claims.

What is claimed is:

1. A process management system for operating on a computer, comprising:
   a graphical user interface for graphically presenting a process or a portion thereof to a user;
   a work element for graphically representing a task to be performed in the process, said work element being expandable into an unlimited number of graphically representable sub-process levels;
   a work product for graphically representing a resultant product of performing a task;
   an agent for graphically representing an actor responsible for performing a task;
   a link for graphically connecting said work element, work product, and agent indicative of inter-relationships therebetween; and
   a knowledge repository coupled to said computer for storing valuable information regarding the process.

2. The process management system, as set forth in claim 1, wherein said link includes a responsibility link for connecting an agent with a work element.

3. The process management system, as set forth in claim 1, wherein said link includes an input/output link for connecting a work element with a work product.

4. The process management system, as set forth in claim 3, wherein said input/output link includes a conditional input/output link.

5. The process management system, as set forth in claim 1, wherein said link includes an iteration link indicative of an iterative relationship.

6. The process management system, as set forth in claim 1, further comprising a plurality of properties being associated with said work element.

7. The process management system, as set forth in claim 6, wherein said properties associated with said work element includes a standard trait for associating any industry or organizational standard with the performance of said work element.

8. The process management system, as set forth in claim 6, wherein said properties associated with said work element includes a technique trait for associating any technique applicable to performing said work element.

9. The process management system, as set forth in claim 6, wherein said properties associated with said work element includes a training trait for associating any training and educational class with the performance of said work element.

10. The process management system, as set forth in claim 6, wherein said properties associated with said work element includes a policy trait for associating any governmental, industrial, and organizational policy with the performance of said work element.

11. The process management system, as set forth in claim 6, wherein said properties associated with said work element includes a reference trait for associating any reference material with the performance of said work element.

12. The process management system, as set forth in claim 1, further comprising a plurality of properties being associated with said work product.

13. The process management system, as set forth in claim 12, wherein said properties associated with said work product includes a standard trait for associating any industry or organizational standard with said work product.

14. The process management system, as set forth in claim 12, wherein said properties associated with said work product includes a technique trait for associating any technique applicable to making said work product.

15. The process management system, as set forth in claim 12, wherein said properties associated with said work product includes a training trait for associating any training and educational class with making said work product.

16. The process management system, as set forth in claim 12, wherein said properties associated with said work product includes a tool trait for associating any tool applicable to making said work product.

17. The process management system, as set forth in claim 16, wherein said tool trait includes a launchable application.

18. The process management system, as set forth in claim 12, wherein said properties associated with said work product includes a template trait for associating a shell product that may be used as a starting point of making said work product.

19. The process management system, as set forth in claim 18, wherein said template trait includes a launchable application.

20. The process management system, as set forth in claim 12, wherein said properties associated with said work product includes an example trait for associating exemplary completed work products with said work product.

21. The process management system, as set forth in claim 20, wherein said example trait includes a launchable application.

22. The process management system, as set forth in claim 12, wherein said properties associated with said work product includes a reference trait for associating any reference material with said work product.

23. The process management system, as set forth in claim 12, wherein said properties associated with said work product includes a policy trait for associating any governmental, industrial, and organizational policy with said work product.

24. The process management system, as set forth in claim 1, further comprising a plurality of properties being associated with said agent.

25. The process management system, as set forth in claim 24, wherein said properties associated with said agent includes a standard trait for associating any industry or organizational standard with said agent.

26. The process management system, as set forth in claim 24, wherein said properties associated with said agent includes a training trait for associating any training and educational class with said agent.

27. The process management system, as set forth in claim 24, wherein said properties associated with said agent includes a policy trait for associating any governmental, industrial, and organizational policy with said agent.

28. The process management system, as set forth in claim 1, wherein said graphical user interface displays a plurality of windows containing graphical representations of said process.

29. The process management system, as set forth in claim 1, further comprising an exporter for exporting a defined process in a predetermined format.

30. The process management system, as set forth in claim 1, further comprising a process link for linking a defined process to another defined process or a portion thereof.

31. The process management system, as set forth in claim 1, further comprising context-sensitive help.

32. A method for defining and managing a process on a computer, comprising the steps of:

graphically representing a task with a work element graphical object;

defining properties associated with said work element graphical object;

graphically representing a product resulting from performing a task with a work product graphical object;

defining properties associated with said work product graphical object;

graphically representing an actor with an agent graphical object;

defining properties associated with said agent graphical object; and graphically linking said work element, work product, and agent graphical objects to indicate a process flow, including graphically representing an iterative link corresponding to an iterative relationship.

33. The method, as set forth in claim 32, further comprising the step of graphically representing said work element being expandable into an unlimited number of graphically representable sub-process levels.

34. The method, as set forth in claim 32, wherein the graphically linking step includes the step of graphically representing a responsibility link for connecting an agent graphical object with a work element graphical object.

35. The method, as set forth in claim 32, wherein the graphically linking step includes the step of graphically representing an input/output link for connecting a work element graphical object with a work product graphical object.

36. The method, as set forth in claim 35, wherein the graphically representing input/output link step includes the step of graphically representing a conditional input/output link.

37. The method, as set forth in claim 32, wherein the step of defining properties associated with said work element graphical object includes the step of defining a standard trait for associating any industry or organizational standard with the performance of said work element graphical object.

38. The method, as set forth in claim 32, wherein the step of defining properties associated with said work element graphical object includes the step of defining a technique trait for associating any technique applicable to performing said work element graphical object.

39. The method, as set forth in claim 32, wherein the step of defining properties associated with said work element graphical object includes the step of defining a training trait for associating any training and educational class with the performance of said work element graphical object.

40. The method, as set forth in claim 32, wherein the step of defining properties associated with said work element graphical object includes the step of defining a policy trait for associating any governmental, industrial, and organizational policy with the performance of said work element graphical object.

41. The method, as set forth in claim 32, wherein the step of defining properties associated with said work element graphical object includes the step of defining a reference trait for associating any reference material with the performance of said work element graphical object.

42. The method, as set forth in claim 32, wherein the step of defining properties associated with said work product graphical object includes the step of defining a standard trait for associating any industry or organizational standard with said work product graphical object.

43. The method, as set forth in claim 32, wherein the step of defining properties associated with said work product graphical object includes the step of defining a technique trait for associating any technique applicable to making said work product graphical object.

44. The method, as set forth in claim 32, wherein the step of defining properties associated with said work product graphical object includes the step of defining a training trait for associating any training and educational class with making said work product graphical object.

45. The method, as set forth in claim 32, wherein the step of defining properties associated with said work product graphical object includes the step of defining a tool trait for associating any tool applicable to making said work product.

46. The method, as set forth in claim 45, wherein the step of defining said tool trait includes the step of defining a launchable application.

47. The method, as set forth in claim 32, wherein the step of defining properties associated with said work product graphical object includes the step of defining a template trait for associating a shell product that may be used as a starting point of making said work product graphical object.

48. The method, as set forth in claim 47, wherein the step of defining said template trait includes the step of defining a launchable application.

49. The method, as set forth in claim 32, wherein the step of defining properties associated with said work product graphical object includes the step of defining an example trait for associating exemplary completed work products with said work product graphical object.

50. The method, as set forth in claim 49, wherein the step of defining said example trait includes the step of defining a launchable application.

51. The method, as set forth in claim 32, wherein the step of defining properties associated with said work product graphical object includes the step of defining a reference trait for associating any reference material with said work product graphical object.

52. The method, as set forth in claim 32, wherein the step of defining properties associated with said work product graphical object includes the step of defining a policy trait for associating any governmental, industrial, and organizational policy with said work product graphical object.

53. The method, as set forth in claim 32, wherein the step of defining properties associated with said agent graphical object includes the step of defining a standard trait for associating any industry or organizational standard with said agent graphical object.

54. The method, as set forth in claim 32, wherein the step of defining properties associated with said agent graphical object includes a training trait for associating any training and educational class with said agent graphical object.

55. The method, as set forth in claim 32, wherein the step of defining properties associated with said agent graphical object includes the step of defining a policy trait for associating any governmental, industrial, and organizational policy with said agent graphical object.

56. The method, as set forth in claim 32, further comprising the step of providing a plurality of windows containing graphical representations of levels said process.

57. The method, as set forth in claim 32, further comprising the step of providing a plurality of dialog windows for receiving property definitions of said work element, work product, and agent graphical objects.

58. The method, as set forth in claim 32, further comprising the step of exporting a defined process in a predetermined format.

59. The method, as set forth in claim 32, further comprising the step of defining a process link for linking a defined process to another defined process or a portion thereof.

60. The method, as set forth in claim 32, further comprising the step of providing context-sensitive help.

61. A method for defining and managing a process on a computer, comprising the steps of:
 graphically displaying a defined process where tasks are graphically represented by a work element graphical object, products resulting from performing a task are graphically represented by a work product graphical object, actors are graphically represented with an agent graphical object, and said graphical objects are linked to indicate a process flow;
 expanding a work element graphical object to drill down to a graphical representation of a sub-process; and
 displaying properties associated with said work element, work product, and agent graphical objects.

62. The method, as set forth in claim 61, wherein the property displaying step includes the step of displaying a standard trait associating any industry or organizational standard with the performance of said work element graphical object.

63. The method, as set forth in claim 61, wherein the property displaying step includes the step of displaying a technique trait for associating any technique applicable to performing said work element graphical object.

64. The method, as set forth in claim 61, wherein the property displaying step includes the step of displaying a training trait for associating any training and educational class with the performance of said work element graphical object.

65. The method, as set forth in claim 61, wherein the property displaying step includes the step of displaying a policy trait for associating any governmental, industrial, and organizational policy with the performance of said work element graphical object.

66. The method, as set forth in claim 61, wherein the property displaying step includes the step of displaying a reference trait for associating any reference material with the performance of said work element graphical object.

67. The method, as set forth in claim 61, wherein the property displaying step includes the step of displaying a standard trait for associating any industry or organizational standard with said work product graphical object.

68. The method, as set forth in claim 61, wherein the property displaying step includes the step of displaying a technique trait for associating any technique applicable to making said work product graphical object.

69. The method, as set forth in claim 61, wherein the property displaying step includes the step of displaying a training trait for associating any training and educational class with making said work product graphical object.

70. The method, as set forth in claim 61, wherein the property displaying step includes the step of displaying a tool trait for associating any tool applicable to making said work product.

71. The method, as set forth in claim 61, wherein the property displaying step includes the step of launching an application.

72. The method, as set forth in claim 61, wherein the property displaying step includes the step of displaying a template trait for associating a shell product that may be used as a starting point of making said work product graphical object.

73. The method, as set forth in claim 61, wherein the property displaying step includes the step of displaying an example trait for associating exemplary completed work products with said work product graphical object.

74. The method, as set forth in claim 61, wherein the property displaying step includes the step of displaying a reference trait for associating any reference material with said work product graphical object.

75. The method, as set forth in claim 61, wherein the property displaying step includes the step of displaying a policy trait for associating any governmental, industrial, and organizational policy with said work product graphical object.

76. The method, as set forth in claim 61, wherein the property displaying step includes the step of displaying a standard trait for associating any industry or organizational standard with said agent graphical object.

77. The method, as set forth in claim 61, wherein the property displaying step includes the step of displaying a training trait for associating any training and educational class with said agent graphical object.

78. The method, as set forth in claim 61, wherein the property displaying step includes the step of displaying a policy trait for associating any governmental, industrial, and organizational policy with said agent graphical object.

79. The method, as set forth in claim 61, further comprising the step of exporting a defined process in a predetermined format.

* * * * *